Feb. 10, 1942.   L. R. BEARD   2,272,764
REFRIGERATING SYSTEM
Filed Oct. 17, 1940
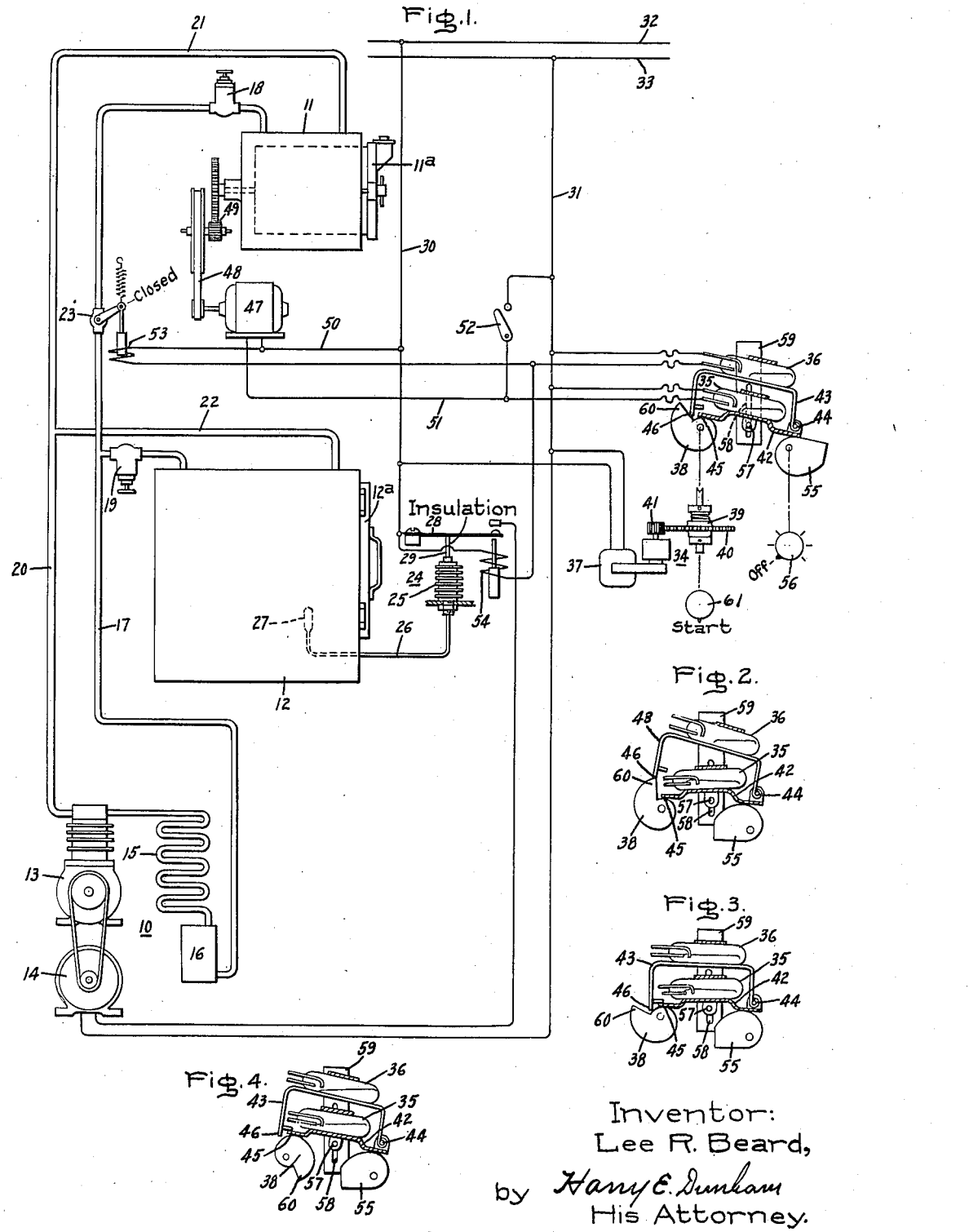
Inventor:
Lee R. Beard,
by Harry E. Dunham
His Attorney.

Patented Feb. 10, 1942

2,272,764

UNITED STATES PATENT OFFICE 2,272,764

REFRIGERATING SYSTEM

Lee R. Beard, Fort Wayne, Ind., assignor to General Electric Company, a corporation of New York Application October 17, 1940, Serial No. 361,637

10 Claims. (Cl. 62—114)

My invention relates to refrigerating systems and particularly to such systems having a plurality of cooling units or evaporators connected to a single refrigerant condensing unit.

Many refrigerating systems, such as those employed for freezing and storing ice cream and similar foods, are provided with two or more evaporators supplied with refrigerant from a single condensing unit, but arranged to be maintained at different temperatures. For example, the system may be provided with two evaporators, one for cooling the freezer and the other for maintaining a predetermined temperature in a storage compartment provided either for cooling the mixture to be frozen or for hardening the frozen product. One difficulty which has been encountered in systems of this type is that when the control is designed to provide continuous operation of both evaporators within their temperature limits, the cycle of operation of the system may be very irregular and it may happen that when the freezer is not in operation, the condensing unit will start and stop frequently or "short-cycle." Short-cycling of the condensing unit is objectionable because of frequent starting and stopping of the motor which produces undesirable heating. Accordingly, it is an object of my invention to provide a refrigerating system including a plurality of evaporators supplied with refrigerant from a single condensing unit and having an improved control arrangement for preventing short-cycling of the condensing unit.

Another object of my invention is to provide an improved apparatus for controlling a refrigerating machine having a motor-driven freezer and including an arrangement for insuring positive operation of the freezer evaporator and motor during a predetermined portion of the operating cycle.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig 1 shows diagrammatically a refrigerating system embodying my invention, and Figs. 2 3 and 4 show various positions of the time controlled device forming a part of the system shown in Fig. 1.

The refrigerating system shown on the drawing comprises two evaporators supplied with refrigerant from a single condensing unit, the first evaporator being arranged to cool a freezer for ice cream or the like, and a second evaporator being arranged to cool a storage compartment suitable for storing the mixture before freezing in order to pre-cool it. Both evaporators are controlled by constant pressure expansion valves, the valve on the freezing evaporator being arranged to admit refrigerant to the evaporator at a higher pressure than the valve on the storage compartment evaporator. This arrangement is such that the condensing unit, if connected to both evaporators simultaneously, will supply refrigerant only to the freezing evaporator since the refrigerant pressure will not be reduced sufficiently to open the valve at the inlet to the storage evaporator. A thermostatic control is provided for actuating the condensing unit in accordance with the temperature in the storage compartment, and a shut-off valve is provided in the inlet to the freezing evaporator to prevent the admission of refrigerant to the freezing evaporator when it is desired to refrigerate the storage compartment. In order to control the refrigerating system and operate it in a predetermined cycle, I provide a timing mechanism for operating the system in repeated cycles of predetermined length. The timing mechanism is arranged to operate the system so that during each cycle the freezer beater is first started and the freezer operated for a predetermined length of time during which the storage compartment evaporator and thermal control are prevented from operating. At the end of the predetermined time, the shut-off valve is closed to prevent the admission of refrigerant to the freezer evaporator so that, for the remaining portion of the cycle, the condensing unit is controlled in accordance with the temperature of the storage compartment.

Referring now to the drawing, I have shown a refrigerating system including a refrigerant liquefying side comprising a condensing unit 10 arranged to supply liquid refrigerant to a refrigerant vaporizing side comprising a first evaporator in a freezing compartment 11 having a removable closure or door 11a and a second evaporator in a storage compartment 12 having a door 12a. Condensing unit 10 comprises a compressor 13 driven by an electric motor 14, a condenser 15 and a liquid receiver 16. The condensing unit is arranged to supply liquid refrigerant through a liquid line 17 to the evaporators 11 and 12 under control of constant pressure expansion valves 18 and 19, respectively, valve 18 being arranged to open at a higher pressure than the valve 19. The evaporators of the freezer 11 and the compartment 12 are connected to a compressor suction line 20 by conduits 21 and 22, respectively. A normally closed shut-off valve 23 is provided in the liquid line leading to the valve 18. When this valve is closed, refrigerant may be supplied only to the storage evaporator through the valve 19; and when the valve 23 is open, refrigerant will be supplied only to the freezer evaporator through the valve 18, since the condensing unit 10 will lower the pressure only sufficiently to open the valve 18 and the valve 19 which opens at a lower pressure will remain closed. It is evident then that when the valve 23 is opened, the settings of the valves 18 and 19 are such that the evaporator in the storage compartment 12 will be "starved" or deprived of refrigerant. Valve 23, therefore, makes it possible to select the evaporator which is to be operated at any one time. In order to control the temperature of the storage compartment, I provide a thermostatic control 24 including a bellows 25 connected by a tube 26 to a thermal element or bulb 27 which is arranged in the storage compartment 12. The bellows 25 is arranged to actuate a switch member 28 by means of an insulated rod 29. When the switch 28 is closed, the motor 14 is connected through lines 30 and 31 to alternating current supply lines 32 and 33, thereby starting the condensing unit 10 whenever the temperature of the storage compartment 12 rises above a predetermined value.

In order to control the refrigerating system so that it operates in repated cycles of predetermined length, I provide a timing mechanism 34 arranged to operate a pair of mercury switches 35 and 36. The timing mechanism 34 comprises a synchronous motor 37 arranged to drive a cam 38 in a counterclockwise direction through a friction clutch 39 and a suitable gear and pinion 40 and 41. The switches 35 and 36 are secured on rocker arms 42 and 43, respectively, pivoted together at 44 and having their other ends 45 and 46, respectively, resting on the surface of the cam 38.

The switch 35 controls the circuit of an electric motor 47 which drives an agitator or beater within the freezer 11 through a belt 48 and gearing 49. When the switch 35 is closed, the motor 47 is connected across lines 30 and 31 through connections 50 and 51, respectively. A manual switch 52 may also be provided to shunt the switch 35 and operate the motor 47 whenever desired regardless of the opening of the switch 35.

The switch 36 is arranged to connect across the lines 30 and 31 a solenoid 53 for opening the valve 23 and a solenoid 54 for closing the switch 28 regardless of the position of the bellows 25. When the solenoids 53 and 54 are energized, the condensing unit is started by the closing of the switch 28 and the valve 23 is opened so that refrigerant is supplied to the freezer evaporator under the control of the valve 18.

A cam 55 arranged to be rotated by a manually operable knob 56 is provided in order to shift vertically the position of the pivot 44 which determines the position of the right-hand ends of the switches 35 and 36. The rocker arm 42 is provided with a pin 57 arranged to move in a slot 58, in a stationary support 59. Cam 55 in its "off" position as shown, maintains the pivot 44 at its lowermost position and prevents the closing of the contacts of the switches 35 and 36 regardless of the position of the cam 38. When the knob 56 is turned in a clockwise direction, the cam 55 gradually raises the pivot 44 and the position of this cam determines the portion of the cycle during which the switches 35 and 36 will be closed.

The manner in which the cam 38 and the rocker arms 42 and 43 cooperate to produce the desired cycle of operation of the refrigerating system will be understood more readily upon reference to Figs. 2, 3 and 4 which illustrate various positions of the cam 38 and the switches 35 and 36 during operation of the timing mechanism after the cam 55 has been rotated to lift the right hand ends of the arms 42 and 43 to their operating positions. Although the motor 37 is energized continuously to drive the cam 38, it is effective to actuate the switches 35 and 36 only when the cam 55 has been rotated from its position in Fig. 1. In Fig. 2 the cam 38 is in a position in which the end 45 of the arm 42 has just dropped off a shoulder 60 at the outermost portion of the cam, thereby causing the mercury in the switch 35 to close the switch contacts. The end 46 of the arm 43 is still in its outermost position on the shoulder of the cam. When the cam is in the position shown in Fig. 2 the switch 35 is closed and the beater motor is in operation. After the cam has rotated through a further small angle, the end 46 of the arm 43 will drop off the shoulder of the cam and close the switch 36 thereby energizing the solenoids 53 and 54 to start the condensing unit and supply refrigerant to the freezer evaporator. The switches 35 and 36 will remain closed as indicated in Fig. 3 for a predetermined portion of the cycle during which time the freezer will continue in operation; at the end of this portion of the cycle the cam 38 will reach a position as indicated in Fig. 4, which shows the circuit of the solenoids 53 and 54 broken by the opening of the switch 36. This allows the valve 23 to close and enables the condensing unit to operate under control of the storage compartment thermostat to supply refrigerant to the storage compartment evaporator, it being understood that the condensing unit will continue to operate only if the thermostatic control calls for cooling of the storage compartment. The continued rotation of the cam 38 will next further raise the arm 42 and tilt and open the switch 35 to deenergize the beater motor shortly after the solenoids 53 and 54 have been deenergized. The refrigerating system will operate under control of the storage compartment thermostat until the cam has again reached its position at the beginning of the cycle as indicated in Fig. 2.

The cam 38 may be turned manually to start the cycle whenever desired, a knob 61 being provided to turn the cam independently of the motor 37, the friction clutch 39 being provided for this purpose. The complete cycle, therefore, may be started at any desired time.

During the operation of the refrigerating system shown in the drawing, the freezer is filled with a quantity of the mixture to be frozen which has been precooled in the storage compartment. After the closure 11a of the freezer has been secured in place, the control knob 56 may be turned to raise the right hand ends of the rocker arms 42 and 43 to provide operation of the freezer during a predetermined portion of the cycle, say three minutes, for example. The operation of the timer motor 37 will then control the system in repeated cycles of predetermined length, ten minutes for example, during each of which the beater will first be started and then the condensing unit set in operation to refrigerate the freezer alone for the predetermined portion of the cycle and then place the condensing unit under control of the storage compartment thermostat for the remainder of the cycle. Any refrigerant remaining in the freezer evaporator will be removed as the condensing unit continues to operate after the closing of the shut-off valve 23. This continues the cooling of the freezer until its supply of refrigerant is exhausted. The operation of the beater is continued during this removal of the refrigerant from the freezer evaporator, but will be terminated before the end of the cycle. In the foregoing manner, the system will operate to insure refrigeration of both the freezer and the storage compartment without producing short-cycling of the condensing unit which might be caused by the varying demands of the two evaporators. The length of the operating cycle may be selected for a given refrigerating system to provide adequate refrigeration of both the storage compartment and the freezer while minimizing the demand for starting and stopping of the condensing unit motor.

While I have shown a particular embodiment of my invention in connection with a refrigerating system for precooling a food mixture to be frozen and for freezing the mixture, other applications will readily be apparent to those skilled in the art. I do not, therefore, desire my invention to be limited to the particular construction shown and described, and I intend in the appended claims to cover all modification within the spirit and scope of my invention.

What I claim as new and desire to secure by Letters Patent of the United States, is:

1. A refrigerating system including two evaporators, common means for supplying refrigerant to said evaporators, means arranged to control the admission of refrigerant to one of said evaporators and to cooperate with said common supply means for maintaining a predetermined pressure within said one evaporator, means arranged to control the admission of refrigerant to the other of said evaporators and to cooperate with said supply means for maintaining a predetermined pressure in said other evaporator lower than in said one evaporator, shut-off means for preventing the admission of refrigerant to said one evaporator, control means dependent upon the temperature produced by said other evaporator for effecting operation of said supply means, and a time controlled mechanism for operating said refrigerating system in repeated cycles of a predetermined length of time, each cycle including first opening said shut-off means for admitting refrigerant to said one evaporator and starting the operation of said supply means to supply refrigerant to said one evaporator and operating the same continually for a predetermined length of time and thereafter closing said shut-off means and placing said common supply means for the remainder of the cycle under control of said temperature dependent control means.

2. A refrigerating system including a freezer and a storage chamber, cooling elements for said freezer and for said storage chamber, means for supplying refrigerant to said cooling elements, an agitator for said freezer and driving mechanism for said agitator, and a time controlled mechanism for operating said system in repeated cycles of predetermined length, each of said cycles comprising first starting said agitator and thereafter actuating said supplying means to supply refrigerant to the cooling element for said freezer and operating said freezer for a predetermined portion of the cycle and then terminating operation of said freezer and rendering the cooling element for said storage chamber effective to cool said chamber for the remaining portion of the cycle.

3. A refrigerating system including a freezer and a storage chamber, cooling elements for said freezer and said storage chamber, means for supplying refrigerant to said cooling elements, an agitator for said freezer and driving mechanism for said agitator, means dependent upon the temperature of the one of said cooling elements for said cooling chamber for controlling said refrigerant supplying means, and a time controlled mechanism for operating said system in repeated cycles of predetermined length, each of said cycles comprising first starting said agitator and thereafter actuating said supplying means to supply refrigerant to the cooling element for said freezer for a predetermined portion of said cycle while preventing effective operation of said temperature dependent means and then stopping the admission of refrigerant to said freezer and rendering said temperature dependent means effective to control said supplying means for the remainder of the cycle and stopping said agitator after stopping the admission of refrigerant to said freezer.

4. A refrigerating system including a freezer and a storage chamber and an evaporator for said freezer and an evaporator for said storage chamber, common means for supplying liquid refrigerant to said evaporators and for withdrawing vaporized refrigerant therefrom, means dependent upon the pressures in said evaporators and arranged to cooperate with said refrigerant supplying means for preventing the admission of refrigerant to said storage chamber evaporator during operation of said freezer evaporator, means arranged to prevent the admission of refrigerant to said freezer evaporator and rendering said pressure dependent means effective to admit refrigerant to said storage evaporator, an agitator for said freezer and actuating mechanism therefor, means dependent upon the temperature of said storage evaporator for controlling said supplying means, and a time controlled mechanism for operating said system in repeated cycles of predetermined length, each of said cycles comprising first starting said agitator and actuating said supplying means to supply refrigerant to said freezer evaporator for a predetermined portion of said cycle and simultaneously with the actuation of said supply means rendering ineffective said means for preventing the admission of refrigerant to said freezer evaporator and also rendering ineffective said temperature dependent means and thereafter stopping the admission of refrigerant to said freezer and rendering said temperature dependent means effective to control said supplying means for cooling said storage compartment during the remainder of the cycle and stopping said agitator an interval after stopping the supply of refrigerant to said freezer.

5. A refrigerating system including a freezer and a storage chamber, an evaporator for cooling said freezer and an evaporator for cooling said storage chamber, a condensing unit for supplying refrigerant to said evaporators and for withdrawing refrigerant therefrom, valves dependent upon the pressures in said evaporators for controlling the admission of refrigerant to said evaporators, the one of said valves for controlling the admission of refrigerant to said freezer evaporator being arranged to open in response to a higher pressure than the valve for controlling the admission of refrigerant to said storage evaporator, a solenoid operated shut-off valve on the inlet to said freezer evaporator, an agitator for said freezer and a motor for driving the same, a thermostatically operated switch dependent upon the temperature of said storage evaporator for controlling said condensing unit, a solenoid actuated member for closing said switch independently of the temperature of said storage evaporator, and a time controlled mechanism for operating said refrigerating system in repeated cycles of predetermined length, said control being arranged and constructed so that each cycle comprises starting said agitator motor and then opening said solenoid operated valve and simultaneously actuating said solenoid to close said switch whereby said condensing unit is operated to supply said refrigerant to said freezer evaporator for a predetermined portion of the cycle and thereafter deenergizing said solenoid to close said valve and render said thermostatic control effective to control said condensing unit to supply refrigerant to said storage evaporator for the remaining portion of the cycle and stopping said agitator after deenergizing said solenoid.

6. Apparatus for controlling a refrigerating machine having a refrigerant liquefying side including a compressor and a motor for driving the same and a refrigerant vaporizing side including a freezer having a beater and a motor for driving the beater, said apparatus comprising a timer for energizing said beater motor periodically, means for controlling the operation of said compressor motor, means responsive to the temperature of a portion of said refrigerant vaporizing side for effecting the operation of said control means, and additional control means arranged to render said temperature responsive means ineffective for actuating said compressor motor control means, said timer being arranged to actuate said additional control means during a predetermined period while said beater motor is in operation to provide refrigeration of said freezer during operation of said beater motor.

7. Apparatus for controlling a refrigerating machine having a refrigerant liquefying side including a compressor and a motor for driving the same and a refrigerant vaporizing side including a freezer having a beater and a motor for driving the beater, said apparatus comprising a timer for energizing the beater motor periodically, a switch for controlling the operation of the compressor motor, means responsive to the temperature of a portion of the refrigerant vaporizing side for actuating said switch, and a solenoid for closing said switch independently of said temperature responsive means when said solenoid is energized, said timer being arranged to energize said solenoid during a predetermined period while the beater motor is energized to provide refrigeration of the freezer during operation of the beater motor.

8. A refrigerating system including a freezer and a storage chamber, cooling elements for said freezer and for said storage chamber, means including a compressor and a motor for driving the same for supplying refrigerant to said cooling elements, an agitator for said freezer and a motor for driving said agitator, means responsive to the temperature of one of said cooling elements for controlling the operation of said compressor motor, a timer for controlling the operation of said agitator motor, a solenoid associated with said temperature responsive means for energizing the compressor motor regardless of the position of operation of said temperature responsive means, and means connecting said solenoid and said timer for first starting said agitator motor and then actuating said solenoid to start said compressor motor to supply refrigerant to said freezer during the operation of said agitator motor.

9. A refrigerating system including a freezer and a storage chamber, cooling elements for said freezer and for said storage chamber, means including a compressor and a compressor motor for driving the same for supplying refrigerant to said cooling elements, an agitator for said freezer and an agitator motor for driving the same, a switch for controlling the operation of said compressor motor, means responsive to the temperature of one of said cooling elements for controlling the operation of said switch, a timer for controlling the operation of said agitator motor, a solenoid for closing said switch to operate said compressor motor regardless of the position of operation of said temperature responsive means, and means connecting said solenoid and said timer for first starting said agitator motor and then actuating said solenoid to start said compressor motor to supply refrigerant to the freezer cooling element during the operation of said agitator motor 10. A refrigerating system including a freezer and a storage chamber, cooling elements for said freezer and for said storage chamber, means including a compressor and a compressor motor for driving the same for supplying refrigerant to said cooling elements, an agitator for said freezer and an agitator motor for driving the same, a switch for controlling the operation of said compressor motor, means responsive to the temperature of one of said cooling elements for controlling the operation of said switch, a timer for controlling the operation of said agitator motor, a solenoid for closing said switch to operate said compressor motor regardless of the position of operation of said temperature responsive means, and means connecting said solenoid and said timer for first starting said agitator motor and then actuating said solenoid to start said compressor motor to supply refrigerant to the freezer cooling element during the operation of said agitator motor, said timer further being constructed and arranged to deenergize said solenoid to render said temperature responsive means effective at the end of a predetermined period and thereafter to stop the operation of said agitator motor.

LEE R. BEARD.